J. W. TAYLOR.
PARACHUTE.
APPLICATION FILED OCT. 25, 1918.
1,340,259. Patented May 18, 1920.
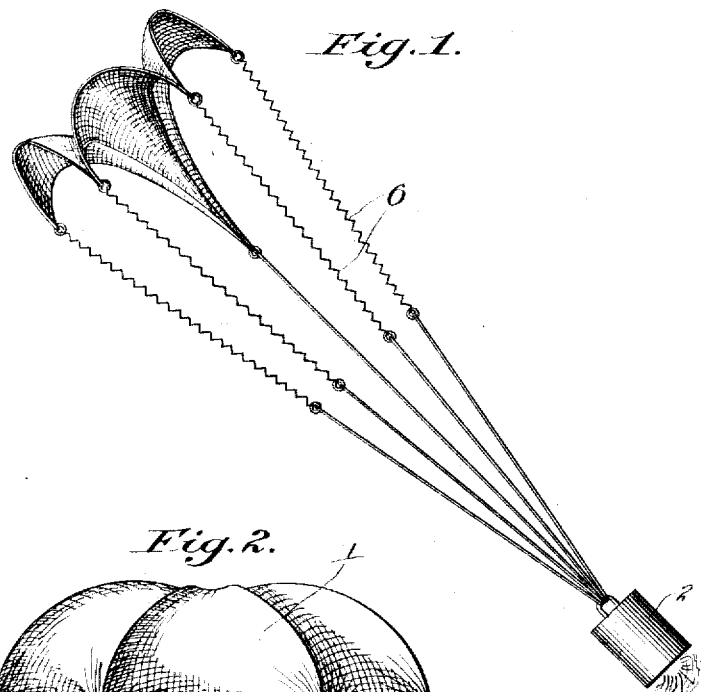
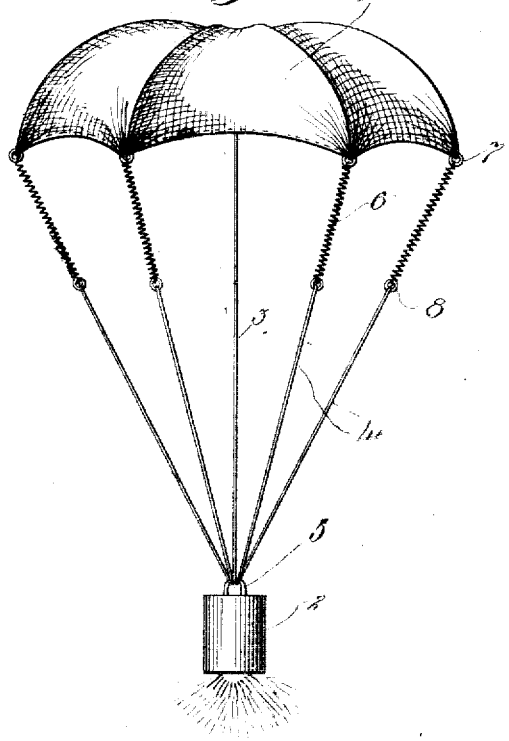
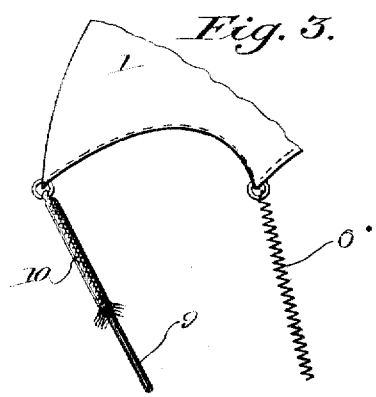
Inventor:
J. W. Taylor.

UNITED STATES PATENT OFFICE.

JOHN WALLACE TAYLOR, OF PHILADELPHIA, PENNSYLVANIA.

PARACHUTE.

1,340,259.　　　　Specification of Letters Patent.　　Patented May 18, 1920.

Application filed October 25, 1918. Serial No. 259,680.

*To all whom it may concern:*

Be it known that I, JOHN WALLACE TAYLOR, a citizen of the United States, and a resident of Philadelphia, in the county of Philadelphia and State of Pennsylvania, have invented certain new and useful Improvements in Parachutes, of which the following is a specification.

My invention is an improvement in parachutes, and has for its object to provide a device of the character specified, especially adapted for supporting an illuminant packed in a suitable container, and in the form of a projectile adapted to be fired from a gun and exploded at a predetermined point to release the illuminant and the parachute, wherein the parachute is so arranged to relieve stresses imposed thereupon in retarding the velocity of the illuminant at the high velocity at first obtaining.

In the drawings:—

Figure 1 is a perspective view of the improved parachute in operation with the parachute arranged to spill a portion of the air, Fig. 2 is a side view with the parachute in extended and supporting form, and Fig. 3 is an enlarged detail perspective view showing the resilient connection.

In practice, a great deal of difficulty has been encountered in devices of this character in providing a suitable parachute for the work, due to the exceedingly high velocities at which the parachute is liberated. The stresses imposed upon the parachute in retarding the linear velocity of the illuminant at these high velocities are simply tremendous, and are almost beyond the limits of endurance of any available material of construction.

In order to enable the parachute to remain intact during this period of operation, four methods have been used. First, making the parachute as strong as possible; second, making the parachute as small as practicable, even at the sacrifice of suitable supporting area for floating after the flight has been checked; third, liberating the parachute only near the extreme ranges of a zone where the velocity of the projectile flight is comparatively low; fourth, delaying the action of the means for opening the parachute, as for instance unrolling from the ball, or the use of multiple parachutes.

In the present embodiment of the invention, this difficulty is overcome by so arranging the parachute, that during the high velocities of flight, the supporting surface of the parachute is reduced, this reduction being controlled directly by the velocity.

In the present instance, this is brought about by so arranging the parachute that a portion of the air may spill from the cover when the velocity exceeds a certain predetermined rate, certain supporting cords of the parachute, namely those cords connecting the cover with the illuminant casing being resilient, so that the effective area of the parachute will be decreased and the air spilled out whenever the stress becomes greater than the safe work stress of the material of construction.

In other words, it will be impossible to overload the parachute. Thus when checking the flight of the illuminant container, the parachute will exert the maximum force of retardation, for which it was designed, but no more. It will therefore take a little longer time to check the velocity, but this can be taken into consideration by the gunner for it will function more safely and surely.

With these elastic cords, the greater the velocity the more the parachute tends to turn inside out and decrease its area. While the parachute yields under the overloading it will automatically exert its maximum force of retardation.

In the present embodiment of the invention shown, the parachute cover 1 is connected to the casing or container 2 for the illuminant, by two series of cords, namely a series 3 of flexible nonelastic cords, and a series 4 of flexible elastic cords. These cords 3 and 4 are connected at one end to a staple 5 on the container, and the cord or cords 3 are connected directly to the cover at their other ends. The other ends of the cords 4 have however a spring 6 interposed between the cord and the cover, each spring being connected at one end to a ring 7 of the cover and at the other to a ring 8 on the cord.

The springs may be, as shown in Figs. 1 and 2, coil springs, or they may be as shown in Fig. 3, rubber filament cord. At least one cord is made nonextensible, and at least one cord extensible. It is obvious that a single elastic element may be made to serve several extensible cords or even all of the said cords, and that the location of the elastic elements for the extensible cords is immaterial, whether central at one end or at the other.

I claim:—

1. In a parachute, the combination of a cover or body and the object to be supported and the connections between the edges of the cover or body and the said object, of means for varying the effective area of the said cover or body in accordance with the velocity of the parachute, said means comprising resilient members interposed in sundry of the said connections, the other of said connections being non-resilient.

2. In a parachute, the combination with the cover, the object to be supported and the flexible connections between the edges of the cover and the said object, sundry of said connections being resilient and the remainder non-resilient to permit air to spill from the cover when said cover is subjected to excessive air pressures.

3. In a parachute, the combination with the cover, the object to be supported and the flexible connections between the edges of the cover and the said object, of means interposed in sundry of the said connections for permitting said connections to yield when the cover is subjected to excessive air pressures.

JOHN WALLACE TAYLOR.